(12) United States Patent
Ahvenainen

(10) Patent No.: US 6,181,939 B1
(45) Date of Patent: Jan. 30, 2001

(54) METHOD OF PROCESSING MOBILE STATION DATA

(75) Inventor: Jouko Ahvenainen, Helsinki (FI)

(73) Assignee: Nokia Networks Oy, Espoo (FI)

( * ) Notice: Under 35 U.S.C. 154(b), the term of this patent shall be extended for 0 days.

(21) Appl. No.: 09/404,613

(22) Filed: Sep. 23, 1999

Related U.S. Application Data

(63) Continuation of application No. PCT/FI99/00125, filed on Feb. 17, 1999.

(30) Foreign Application Priority Data

Feb. 18, 1998 (FI) ............................................... 980373

(51) Int. Cl.⁷ ........................................................ H04Q 7/00
(52) U.S. Cl. ............................ 455/433; 455/432; 455/435
(58) Field of Search ..................................... 455/432, 433, 455/435

(56) References Cited

U.S. PATENT DOCUMENTS 5,606,596  2/1997  Jain et al. .
6,021,327 * 2/2000  Nguyen et al. ...................... 455/433

FOREIGN PATENT DOCUMENTS

95/01073  1/1995  (WO) .
98/47305  10/1998  (WO) .

\* cited by examiner

*Primary Examiner*—Lee Nguyen
(74) *Attorney, Agent, or Firm*—Altera Law Group, LLC

(57) ABSTRACT

The present invention relates to a method of processing mobile station data in a mobile communication system in which the subscriber data of the mobile station are registered in a visitor location register which corresponds to the mobile services switching center the coverage area of which the mobile station enters, and in which the subscriber data of the mobile station are deleted from the visitor location register after it has left the coverage area. In order to avoid unnecessary deletion and re-registration of the subscriber data, the method comprises the steps of: defining an algorithm in order to determine a storage time for the subscriber data, storing in a memory information on the entries of the mobile station into the coverage area, determining the storage time with the help of the algorithm and the information stored in the memory, and after the mobile station has left the area, deleting its subscriber data from the visitor location register after the expiration of the storage time unless the mobile station has re-entered the coverage area.

9 Claims, 2 Drawing Sheets

METHOD OF PROCESSING MOBILE STATION DATA

This is a continuation of PCT/FI99/00125 filed Feb. 17, 1999.

FIELD OF THE INVENTION

The present invention relates to a method of processing mobile station data in a mobile communication system which comprises at least a first and a second mobile services switching centre, in which method: the subscriber data of a mobile station is registered in a visitor location register which corresponds to the mobile services switching centre the coverage area of which the mobile station enters, and the subscriber data of the mobile station are deleted from said visitor location register after the mobile station has left the coverage area of the mobile services switching centre which corresponds to the visitor location register. Furthermore, the invention relates to a mobile communication system comprising: a mobile station, at least a first and a second mobile services switching centre, and a visitor location register which corresponds to the first mobile services switching centre, comprising register means for registering in a memory means the subscriber data of the mobile station having entered the coverage area of the first mobile services switching centre, and deletion means for deleting the subscriber data of said mobile station from the memory means after the mobile station has left the coverage area of the first mobile services switching centre.

The present invention relates to maintaining the subscriber data of mobile stations, or subscriber stations, in a mobile communication system in a visitor location register which corresponds to the mobile services switching centre in the coverage area of which the mobile station is located. The invention is therefore suitable for use in a mobile communication system comprising at least two mobile services switching centres and visitor location registers corresponding thereto. In this context, the concept subscriber data refers to both the subscriber data of an individual mobile station and the data of a subscriber group.

DESCRIPTION OF RELATED ART

In a prior art mobile communication system, the subscriber data of a mobile station is stored in a home location register specified for the mobile station in question and, in addition thereto, in the visitor location register of the mobile services switching centre in the coverage area of which the mobile station is located at that time. When moving in the coverage area of the system, the mobile station of the prior art system continuously follows the location area indicated by the base station whose signals are best received by the mobile station. If the mobile station detects when moving from the radio coverage area of the base station to the radio coverage area of another base station that the location area of the new base station differs from that of the previous base station, then the mobile station performs a location update by sending a message via a radio path to the new base station. If the new location area belongs to the coverage area of a new mobile services switching centre, the visitor location register of the new mobile services switching centre sends a message to the home location register of the mobile station in question, notifying the home location register that the mobile station in question has entered the coverage area of the new mobile services switching centre. The subscriber data of the mobile station are in that case also registered in the new visitor location register. Furthermore, the home location register sends a message to the previous visitor location register (the coverage area of the mobile services switching centre the mobile station in question has left), reporting that the mobile station has entered the coverage area of the other mobile services switching centre. After receiving the message in question, the previous visitor location register deletes from its memory the subscriber data of the mobile station indicated in the message. If the mobile station in question belongs to a specific subscriber group, then the visitor location register does not delete the subscriber group data until the last mobile station belonging to the subscriber group leaves the coverage area of the mobile services switching centre in question.

It is a disadvantage of the above-described prior art solution that the subscriber data are deleted from the visitor location register almost immediately after the mobile station in question has left the coverage area of the mobile services switching centre which corresponds to the visitor location register. This means that when the same mobile station re-enters the coverage area of the mobile services switching centre in question, its subscriber data have been deleted from the visitor location register, in consequence of which the data have to be re-registered therein. Copying the subscriber data in question requires a relatively large amount of data transmission capacity. The situation is particularly problematic in a special network, such as a network used by authorities. For example, a police patrol may continuously patrol a specific area possibly composed of coverage areas of several different mobile services switching centres. In that case, the mobile station of the police patrol in question repeatedly leaves and re-enters the coverage area of a given mobile services switching centre.

In the prior art, an attempt is made to solve the above-described problem by storing the subscriber data in the visitor location register for a given period of time of a constant length, for example 10 minutes, from the moment the subscriber has left the coverage area of the mobile services switching centre corresponding to the visitor location register. However, this kind of time period of a constant length is not useful, since it alleviates the situation only in some cases, i.e. when the mobile station leaves the coverage area of the mobile services switching centre only for a short period of time (in this case, for less than 10 minutes). In addition, the prior art solution of the type is not able to adapt to the special needs of an individual mobile station.

SUMMARY OF THE INVENTION

An object of the present invention is to solve the above-mentioned problem by providing a solution by means of which it is easier to delete subscriber data in a more flexible manner from a visitor location register and take subscriber-specific differences into account. This objective is achieved by the method of the invention, which is characterized by comprising the steps of: defining an algorithm by means of which a storage time for the subscriber data of a given mobile station can be determined, the storage time indicating how long the subscriber data of the mobile station have to be stored after the mobile station has left the coverage area of the mobile services switching centre, storing in a memory means information on at least the entries of said mobile station into the coverage area of said mobile services switching centre, determining by means of said algorithm and information stored in the memory means the storage time for the subscriber data of said mobile station, and after the mobile station has left the coverage area of said mobile services switching centre, deleting the subscriber data of said mobile station from the visitor location register after the expiration of the storage time unless the mobile station has re-entered the coverage area of said mobile services switching centre.

The invention also relates to a mobile communication system to which the method of the invention can be applied. The mobile communication system of the invention is characterized in that the system comprises: monitor means storing in a memory information on at least the entries of said mobile station into the coverage area of the first mobile services switching centre, and control means determining, on the basis of the information stored in the memory by the monitor means, the storage time for the subscriber data of the mobile station, the storage time indicating how long the subscriber data of said mobile station have to be stored from the moment the mobile station has left the coverage area of the mobile services switching centre and controlling the deletion means of the visitor location register to delete the subscriber data of said mobile station from the memory means after the mobile station has left the coverage area of the first mobile services switching centre and after the storage time has expired, unless the mobile station has re-entered the coverage area of the mobile services switching centre.

The invention is based on the idea that unnecessary deletion and subsequent continual re-registration of the subscriber data of a given mobile station in the same visitor location register can be avoided by storing in a memory information at least on the movements of the mobile station in question in the network and making a decision to delete the subscriber data on the basis of the information stored in the memory. In other words, by maintaining subscriber-specific data for a predetermined period of time on the entries of the mobile station into coverage areas of different mobile services switching centres, a system can be provided that is capable of taking into account the needs and behaviour of an individual subscriber in subscriber data processing. Consequently, unnecessary deletion of the subscriber data of a given mobile station can be avoided from a visitor location register corresponding to a mobile services switching centre whose coverage area the mobile station shortly re-enters.

Sufficiently detailed monitoring can be achieved even by storing in the memory solely the times the mobile station enters the coverage area of the mobile services switching centre, on the basis of which a storage time can be determined in accordance with the invention for the subscriber data of the mobile station. In accordance with the invention, the time the mobile station has left the coverage area is also preferably stored in the memory in question, and the storage time for the subscriber data can then be determined on the basis of how long the mobile station has altogether been out of the coverage area of the mobile services switching centre. This gives a more realistic picture of the movements of the mobile station.

The invention makes it possible to provide a system capable of learning in such a way that if the subscriber data of a given mobile station is repeatedly deleted at a wrong moment from a visitor location register, the storage time of the subscriber data can be changed (extended or shortened) by changing the algorithm used for the determination of the storage time. The system is able to do this independently by changing the parameters used in the algorithm to achieve a more accurate storage time, for example.

The most significant advantages of the invention and system are therefore less need for unnecessary deletion and re-registration of subscriber data in the same visitor location register, fewer delays in connection with the registration, less need for processing capacity in the home location register, the capability of taking the previous movements of an individual mobile station in the network into account in a decision about deleting the subscriber data, and the ability to provide a system that is extremely flexible and capable of learning.

In a preferred embodiment of the mobile communication system of the invention, the monitor means store in the memory information indicating at least the periods of time between departures from and entries into the area by the mobile station and the number of entries. The information in question is stored in the memory for a predetermined period of time. Each visitor location register may include a separate memory for maintaining this information or, alternatively, the memory may be located in the home location register of the mobile station. When the information stored in the memory indicates that a given mobile station has entered the coverage area of the same mobile services switching centre for a predetermined number of times within the time period in question, a storage time is concluded for the subscriber data of the mobile station in question by means of the information stored in the memory and the algorithm (i.e. deduction rules) used. For example, the length of the storage time may correspond to the longest period of time the mobile station has been out of the coverage area of the mobile services switching centre in question on the basis of the information stored in the memory (i.e. the longest period of time between a departure from and an entry into the area). The deletion of the subscriber data can thus be optimized for the mobile station in question.

BRIEF DESCRIPTION OF THE DRAWINGS

In the following, the invention will be described in more detail by way of example with reference to the accompanying figures, in which.

DETAILED DESCRIPTION OF THE INVENTION

Figure 1:
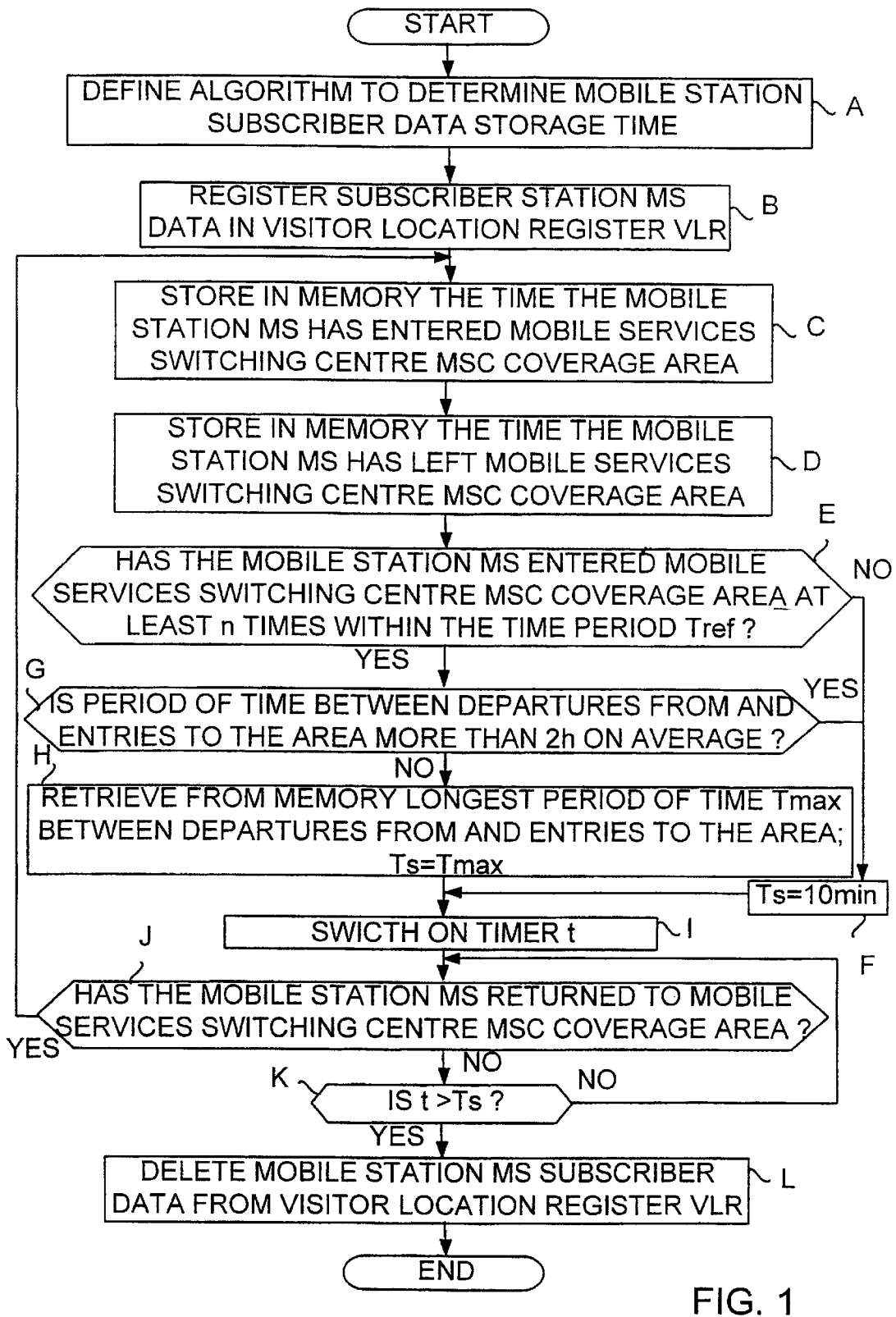
FIG. 1 shows a flow diagram of a first preferred embodiment of the method of the invention.

FIG. 1 shows a flow diagram of a first preferred embodiment of the method of the invention. The flow diagram of FIG. 1 can be applied to subscriber data processing of an individual mobile station in the TETRA network (Terrestrial Trunked Radio), for example.

In block A, an algorithm (detection rules) is defined in order to determine a storage time for the subscriber data of a mobile station. According to the invention, the algorithm in question is defined in such a manner that the algorithm utilizes information collected on the previous movements of the mobile station in the area of the system and stored in a memory. On the basis of this information, the algorithm can be used to determine the storage time of the subscriber data for the mobile station in question. The storage time of the subscriber data indicates to a visitor location register how long it should store the subscriber data of the mobile station from the moment the mobile station has left the coverage area of the mobile services switching centre corresponding to the visitor location register in question. In connection with the flow diagram of FIG. 1 it is assumed that the algorithm is defined in the following way:

if the mobile station has entered the coverage area at least n times (n being three, for example) within a time period Tref (for example 48 h), then the storage time is the longest period of time Tmax between a departure from and an entry into the area, which is stored in the memory (Tmax being 6 h, for example), if the period of time between departures and entries into the area by the mobile station is more than 2 hours on average, then the storage time is nevertheless only 10 minutes, and if the mobile station has entered the coverage area less than n times within a time period Tref, then the storage time is 10 minutes.

In block B, a mobile station MS enters the coverage area of a mobile services switching centre MSC, and its subscriber data are then registered in a visitor location register VLR corresponding to the mobile services switching centre MSC.

In block C, the time the mobile station MS has entered the coverage area of the mobile services switching centre MSC is stored in the memory. In accordance with the invention, the information is maintained in the memory for a time period Tref, and information can then be found in the memory on the entries within the time period in question (of 48 h, for example).

In block D, the mobile station MS leaves the coverage area of the mobile services switching centre MSC. The time the mobile station has left the coverage area of the mobile services switching centre is then stored in the memory. Consequently, information indicating the times the mobile station has left the area within the time period Tref can also be found in the memory.

In blocks E to H, the defined algorithm is applied in order to determine the storage time for the subscriber data.

In block E it is checked from the statistics if the mobile station MS has entered the coverage area of the mobile services switching centre MSC at least n times within the time period Tref, i.e. in the case of FIG. 1, three times within the last 48 hours. If not so, the routine proceeds to block F where a storage time Ts of 10 minutes is obtained. In contrast, if it is detected in block E that the mobile station MS has entered the coverage area of the mobile services switching centre MSC at least three times within the last 48 hours, then it means that the mobile station has repeatedly entered the coverage area in question. In that case, the routine proceeds to block G.

In block G, it is checked if the period of time between departures from and entries into the area by the mobile station is more than 2 hours on average. If so, the routine proceeds to block F, where the storage time Ts of 10 minutes is obtained. In contrast, if the period of time in question is less than 2 hours on average, then the routine proceeds to block H.

In block H, the longest period of time Tmax between departures from and entries into the area is retrieved from the memory, the longest period of time in the following assumed to be 6 hours. Consequently, the Tmax, i.e. 6 hours, is obtained as the storage time.

In block I, a timer t is switched on. As distinct from the flow diagram of FIG. 1, a given maximum time can be defined for the storage time of the subscriber data. In that case, in block I it is checked if the storage time Ts exceeds the defined maximum time (of possibly a couple of hours, for example). If so, the storage time Ts is set to correspond to the maximum time in block 1. Only after this the timer is switched on.

In block J it is checked if the mobile station MS has re-entered the coverage area of the mobile services switching centre MSC. If so, the routine proceeds to block C where the entry time is recorded in the memory. In accordance with the invention, the subscriber data of the mobile station MS are already found in the visitor location register (because they have not yet been deleted therefrom), whereupon it is not necessary to re-register the subscriber data therein.

In contrast, if in block J it is detected that the mobile station MS has not re-entered the coverage area of the mobile services switching centre MSC, the routine proceeds to block K where it is checked if the storage time Ts for the subscriber data of the mobile station in question is exceeded. If not, the routine returns to block J. Otherwise, the routine proceeds to block L where the subscriber data of the mobile station MS in question are deleted from the visitor location register VLR. If the mobile station belongs to a given subscriber group, the subscriber data are deleted only if the mobile station moving off from the area is the last mobile station that belongs to the subscriber group and moves off from the coverage area of the mobile services switching centre.

In accordance with the invention, as distinct from FIG. 1, a system capable of learning can be provided by also monitoring the deletion and reregistration of subscriber data during a longer period of time for a given mobile station. If it then turns out that the storage time given by the algorithm is repeatedly wrong, then the system can automatically adjust the parameters used in the algorithm to provide a more suitable storage time. For example, this can be done by not defining as the storage time Ts the longest period of time Tmax between departures from and entries into the area and retrieved from the memory means, but instead, the storage time is determined by the formula Ts=Tmax*K, where K is a factor that can be adjusted and at the beginning is 1.0, for example. If the system then detects that the storage time is repeatedly too short, then it can increment the factor (K=1.2, for example) or, correspondingly, if the storage time is repeatedly unnecessarily long, then the system can decrement the factor (K=0.8, for example). For each mobile station, a separate factor K then preferably exists for each visitor location register. The system is thus able to adapt to the movements of a given individual mobile station within the area covered by the system.

Figure 2:
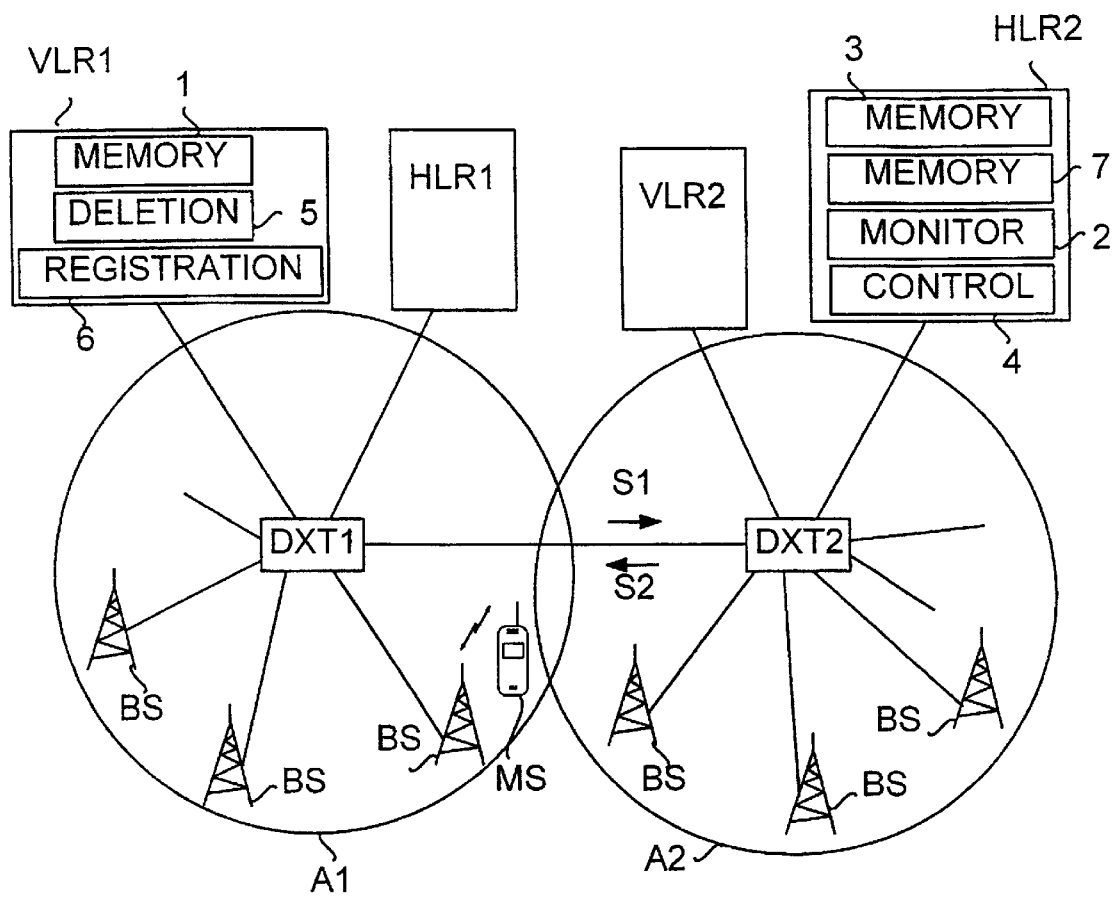
FIG. 2 shows a block diagram of a first preferred embodiment of the mobile communication system of the invention.

FIG. 2 shows a block diagram of a first preferred embodiment of the mobile communication system of the invention. The mobile telephone system presented in FIG. 2 can be part of the TETRA network (Terrestrial Trunked Radio), although the invention can also be utilized in other connections.

In the case of FIG. 2, a mobile station MS moves to and fro between the coverage areas A1 and A2 of mobile services switching centres DXT1 and DXT2. In the case of FIG. 2, the mobile station MS has a home location register HLR2 in the coverage area A1. The subscriber data of the mobile station in question are then registered in a memory 1 of a visitor location register VLR1 corresponding to the mobile services switching centre DXT1.

In order that the subscriber data of the mobile station MS repeatedly moving between the mobile services switching centres DXT1 and DXT2 do not need to be continuously registered and thereafter deleted from the memory of the visitor location register VLR1, monitor means 2 are arranged in the system of FIG. 2. In the case of FIG. 2, the monitor means 2 are located in the home location register HLR2 of the mobile station MS. The movements of the mobile station MS over the entire area covered by the system are monitored using the monitor means. Consequently, when entering the coverage area A1 of the mobile services switching centre DXT1, the mobile station performs a location update, in consequence of which the visitor location register VLR1 notifies the home location register HLR2 of the mobile station in a message S1 that the mobile station MS is located in its coverage area A1. The home location register stores information on this in a manner known per se in a memory 3, and, in addition, the monitor means 2 store in a memory 7 information on the time the mobile station has entered the coverage area A1 of the mobile services switching centre DXT1.

In accordance with the invention, the monitor means 2 maintain in the memory 7 information indicating the times the mobile station MS has entered and left the coverage areas of different mobile services switching centres within a time period Tref of a predetermined length, within the last 48 hours, for example. In other words, the monitor means delete the stored information which is older than 48 hours from the memory 7.

When the home location register HLR2 of the mobile station MS in the case of FIG. 2 receives in the message S1 information indicating that the mobile station has entered the coverage area A1 of the mobile services switching centre DXT1, control means 4 of the home location register HLR2 detect on the basis of the information stored in the memory 7 the number of times the mobile station has entered the coverage area A1 within the time period Tref, the average period of time between departures from and entries into the coverage area A1 by the base station, and the longest period of time Tmax between departures from and entries into the area by the mobile station. On the basis of this information, the control means 4 of the home location register HLR2 control deletion means 5 of the visitor location register VLR1. In other words, the home location register acknowledges the message S1 by sending a message S2 to the visitor location register VLR1, the message S2 including the storage time Ts for the subscriber data of the mobile station, the storage time indicating how long the visitor location register VLR1 has to store the subscriber data of the mobile station in the memory 1 from the moment the mobile station has left the coverage area A1 of the mobile services switching centre DXT1. The storage time is determined as described by way of example in connection with the flow diagram of FIG. 1.

After receiving the message S2, register means 6 of the visitor location register store the subscriber data of the mobile station MS in the memory 1 unless they already exist therein (i.e. the mobile station MS has visited the coverage area earlier and its subscriber data are not yet deleted from the memory 1).

After leaving the coverage area A1 of the mobile services switching centre DXT1 and after entering the coverage area A2 of the mobile services switching centre DXT2, the mobile station MS performs a location update, and the home location register HLR2 then receives information indicating that the mobile station MS is no longer located in the coverage area A1. The monitor means 2 of the home location register HLR2 then store the time the mobile station has left the area in the memory 7. In addition, the home location register HLR2 transmits information indicating the location update performed by the mobile station to the visitor location register VLR1. The deletion means 5 then wait for the storage time Ts they have been notified by the control means 4 in the message S2 before deleting the subscriber data of the mobile station MS from the memory 1. Consequently, if the mobile station returns to the coverage area A1 of the mobile services switching centre DXT1 before the expiration of the above-mentioned storage time Ts, there is no need to re-register its subscriber data in the memory 1, because the deletion means 5 have not yet deleted the data therefrom.

As distinct from the case of FIG. 2, the control means 4 can notify the deletion means 5 of the subscriber data storage time Ts in the same message by means of which the home location register HLR2 notifies the visitor location register VLR1 of the fact that the mobile station has left the coverage area.

Furthermore, as distinct from the case of FIG. 2, the visitor location registers of the system can be equipped with their own monitor means and memories related thereto. In that case, each visitor location register maintains information on the mobile stations entering the coverage area of the mobile services switching centre corresponding thereto. Consequently, no monitor means are required in the home location registers of the mobile stations. In this kind of embodiment, the visitor location registers are independently capable of deciding how long the data of a given mobile station have to be stored after the mobile station has left the coverage area of the mobile services switching centre corresponding to the visitor location register.

It is to be understood that the above description and the figures related thereto are only intended to illustrate the present invention. It will be apparent to those skilled in the art that many variations and modifications can be made to the invention without departing from the scope and spirit of the invention disclosed in the attached claims.

What is claimed is:

1. A method of processing mobile station data in a mobile communication system which comprises at least a first and a second mobile services switching centre, in which method:

a subscriber data of a mobile station are registered in a visitor location register which corresponds to a mobile services switching centre, a coverage area of which the mobile station enters, said method comprises:

defining an algorithm by means of which a storage time for the subscriber data of a given mobile station can be determined, the storage time indicating how long the subscriber data of the mobile station has to be stored after the mobile station has left the coverage area of the mobile services switching centre, storing in a memory means information on at least entries of said mobile station into the coverage area of said mobile services switching centre, determining by means of said algorithm and information stored in the memory means the storage time for the subscriber data of said mobile station, and after the mobile station has left the coverage area of said mobile services switching centre, deleting the subscriber data of said mobile station from the visitor location register after the expiration of the storage time unless the mobile station has re-entered the coverage area of said mobile services switching centre.

2. The method as claimed in claim 1, wherein said algorithm is also changed in the method in order to adjust the length of the storage time.

3. The method as claimed in claim 2, wherein the algorithm is changed in order to increase the storage time if the subscriber data of a given mobile station is repeatedly deleted from the visitor location register before said mobile has re-entered the coverage area of the mobile services switching centre corresponding to the visitor location register.

4. The method as claimed in claim 1, wherein in said memory means is stored at least information by means of which periods of time between departures from and entries into the area by the mobile station and the number of entries can be determined, that the information is maintained in the memory means for a predetermined period of time from the storage moment, and that when the information stored in the memory means indicates that the mobile station has entered the coverage area of said mobile services switching centre for a predetermined number of times within a predetermined period of time, said algorithm is defined to indicate the longest period of time between a departure from and an entry into said area by the mobile station.

5. A mobile communication system comprising:

a mobile station, at least a first and a second mobile services switching centre, a visitor location register which corresponds to the first mobile services switching centre, comprising register means for registering in a memory means a subscriber data of the mobile station having entered the coverage area of the first mobile services switching centre, and deletion means for deleting the subscriber data of said mobile station from the memory means after the mobile station has left the coverage area of the first mobile services switching centre, monitor means storing in a memory information on at least the entries of said mobile station into the coverage area of the first mobile services switching centre, and control means determining, on the basis of the information stored in the memory by the monitor means, a storage time for the subscriber data of the mobile station, the storage time indicating how long the subscriber data of said mobile station have to be stored from the moment the mobile station has left the coverage area of the mobile services switching centre and controlling the deletion means of the visitor location register to delete the subscriber data of said mobile station from the memory means after the mobile station has left the coverage area of the first mobile services switching centre and after the storage time has expired, unless the mobile station has re-entered the coverage area of the mobile services switching centre.

6. The mobile communication system as claimed in claim 5, wherein the monitor means stores in said memory information indicating at least periods of time between departures from and entries into the area by the mobile station and the number of entries, and that said information is stored in the memory for a predetermined period of time.

7. The mobile communication system as claimed in claim 5, wherein when the information stored in the memory indicate that the mobile station has entered the coverage area of the first mobile services switching centre at least a predetermined number of times within a predetermined period of time, the control means controls the deletion means of the visitor location register to delete the subscriber data of the mobile station from the memory means after an expiration of a given storage time of a constant length.

8. The mobile communication system as claimed in claim 5, wherein the information stored in the memory indicate that the mobile station has entered the coverage area of the first mobile services switching centre at least a predetermined number of times within a predetermined period of time, the control means control the deletion means of the visitor location register in such a way that the deletion means delete the subscriber data of the mobile station from the memory means after the expiration of the storage time whose length corresponds to a longest period of time between a departure from and an entry into the area by the mobile station, said period of time being indicated by the information stored in the memory.

9. The mobile communication system as claimed in claim 5, wherein the monitor means controls the control means in such a way that on the basis of the information stored in the memory means, the storage time of the subscriber data determined by the control means be comes longer if the monitor means detect that the subscriber data of a given mobile station are repeatedly deleted from the visitor location register before said mobile station has re-entered the coverage area of the mobile services switching centre corresponding to the visitor location register.

* * * * *